United States Patent
Wedin et al.

(10) Patent No.: US 12,347,599 B2
(45) Date of Patent: Jul. 1, 2025

(54) TRANSFORMER SYSTEM FOR A DIRECT CURRENT CONVERTER SYSTEM

(71) Applicant: Hitachi Energy Ltd, Zürich (CH)

(72) Inventors: Erik Carl Wedin, Karlstad (SE); Semen Pyrog, Isernhagen (DE); Erik Lysell, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/715,106

(22) PCT Filed: Jul. 26, 2022

(86) PCT No.: PCT/EP2022/070967
§ 371 (c)(1),
(2) Date: May 30, 2024

(87) PCT Pub. No.: WO2023/099047
PCT Pub. Date: Jun. 8, 2023

(65) Prior Publication Data
US 2024/0428979 A1    Dec. 26, 2024

(51) Int. Cl.
*H01F 30/12*    (2006.01)
*H01F 27/28*    (2006.01)
*H02M 7/00*    (2006.01)

(52) U.S. Cl.
CPC ............ *H01F 27/28* (2013.01); *H02M 7/003* (2013.01)

(58) Field of Classification Search
CPC .......... H01F 27/28; H01F 30/10; H01F 30/12; H02M 7/003

USPC ............................................................ 336/5
See application file for complete search history.

(56) References Cited

U.S. PATENT DOCUMENTS

| | | | |
|---|---|---|---|
| 3,235,823 A * | 2/1966 | Renberg, Jr. ............ | H01F 27/02 336/12 |
| 2020/0203066 A1* | 6/2020 | Schweiger .............. | H01F 30/10 |

FOREIGN PATENT DOCUMENTS

| | | |
|---|---|---|
| CN | 106953532 A | 7/2017 |
| CN | 209105050 U | 7/2019 |
| CN | 112434434 A | 3/2021 |
| CN | 216672848 U | 6/2022 |
| DE | 102016216949 A1 | 3/2018 |
| EP | 0471183 A2 | 2/1992 |
| EP | 2587658 A2 | 5/2013 |
| EP | 3232452 A1 | 10/2017 |
| EP | 3661037 A1 | 6/2020 |
| JP | 2000021644 A * | 1/2000 |

OTHER PUBLICATIONS

International Search Report and Written Opinion of the International Searching Authority, International Application No. PCT/EP2022/070967, mailed Dec. 9, 2022, 9 pages.

(Continued)

*Primary Examiner* — Tszfung J Chan
(74) *Attorney, Agent, or Firm* — Sage Patent Group

(57) ABSTRACT

A transformer system for a direct current converter system includes a plurality of windings for three electrical phases, the windings being electrically connected to provide a 15° phase shift, and including at least three separate tanks, wherein the associated to different electrical phases are located in different ones of the separate tanks.

8 Claims, 2 Drawing Sheets

(56) References Cited

OTHER PUBLICATIONS

Figure 1:
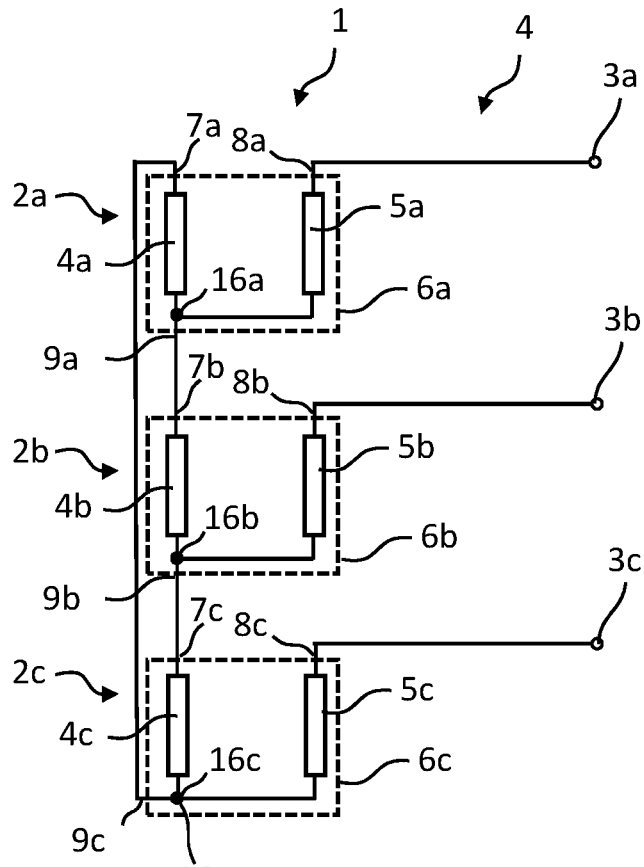

International Preliminary Report on Patentability, International Application No. PCT/EP2022/070967, mailed Mar. 1, 2024, 7 pages.
Written Opinion of the International Preliminary Examining Authority, International Application No. PCT/EP2022/070967, mailed Jul. 21, 2023.
Wang, Mengxia et al., "A New 24-pulse Rectifier Transformer with Delta-extended Connection," IOP Conf. Series: Earth and Environmental Science 223, 2019, 6 pages.
Anandpara, Milan et al., "An Active Interphase Transformer for 12-Pulse Rectifier System to Get the Performance Like 24-Pulse Rectifier System," 10.1109/NPSC.2014.7103802, IEEE, 2014, 6 pages.
Mon-Nzongo, D.L. et al., "An Improved Topology for Multi-pulse AC/DC Converters within HVDC and VFD Systems: Operation in Degraded Modes," IEEE Transactions on Industrial Electronics, vol. 65, No. 5, May 2018, 11 pages.
Solak, Krzysztof et al., "Differential Protection of Converter Transformers," 2016 17th International Scientific Conference on Electric Power Engineering (EPE), Prague, Czech Republic, IEEE, 6 pages.
Campostrini, Francesco, Thesis, "Modelling of 'Extended-Delta' Transformers for Power Converters," Universita Degli Studi Di Padova, 2016, 100 pages.
Modern Power Systems, "HVDC fifty years on," published Oct. 31, 2004, downloaded from the Internet on May 28, 2024 from: https://www.modernpowersystems.com/analysis/hvdc-fifty-years-on/, 13 pages.
Gaonkar, A.D. et al., "Multi-winding Phase-Shifting Transformer for 36-Pulse Rectifier: Winding Turns Design and Analysis," 2016 North American Power Symposium (NAPS), Denver, CO, USA, 2016, IEEE, 6 pages.
Dortort, Isadore K., Phase Shifting of Harmonics in AC Circuits of Rectifiers, IEEE Transactions on Industry and General Applications, vol. 1GA-4, No. 6, Nov./Dec. 1968, 4 pages.
Hitachi, Vindhyachal—Commissioned in 1989, Vindhyachal was the first back-to-back HVDC station in India,: downloaded from the Internet on May 22, 2024 from: https://www.hitachienergy.com/about-us/customer-success-stories/vindhyachal, 5 pages.

\* cited by examiner

TRANSFORMER SYSTEM FOR A DIRECT CURRENT CONVERTER SYSTEM

CROSS REFERENCE TO RELATED APPLICATIONS

This application is a 35 U.S.C. § 371 national stage application of PCT International PCT/EP2022/070967 filed on Jul. 26, 2022, which claims priority to Chinese Patent Application No. 202122993418.5, filed on Dec. 1, 2021, the disclosures and content of which are incorporated by reference herein in their entireties.

The present disclosure relates to a transformer system for a direct current (DC) converter system. The converter system may be suitable for high voltage direct current (HVDC) or Ultra High Voltage Direct Current (UHVDC) power transmission, for example.

At least some embodiments of the disclosure relate to an improved transformer system for a direct current converter system. As an example, the transformer system may be easier to transport to and/or install at an installation site.

According to a first aspect, a transformer system for a direct current converter system comprises a plurality of windings for three electrical phases, the windings being electrically connected to provide a 15° phase shift, and comprising at least three separate tanks, wherein the windings associated to different electrical phases are located in different ones of the separate tanks. The 15° phase shift may be a phase shift by +15° or −15°.

Each of the separate transformer sub-parts as defined by the separate tanks can be also denoted as a transformer unit. The transformer system may be defined as comprising three or more single-phase units, interconnected to each other to form the transformer system. In other words, the three or more single-phase units form a three-phase transformer. Each of the transformer units comprises primary and secondary windings, attributed to primary side and the secondary side, which may be the line-side and the valve-side, respectively.

The transformer system may comprise for each electrical phase a first winding and a second winding, the windings of all electrical phases connected in an extended-side delta configuration. As an example, the first winding and the second winding may be secondary-side windings. For each electrical phase exactly one first winding and exactly one second winding may be provided. It is also possible that more than one first winding and more than two second windings are provided, depending on the power requirements per winding. The transformer may further comprise for each electrical phase at least one winding for the primary side, in particular the line-side.

The first winding and second winding may be located on a common core. As an example, the first winding and the second winding may be located on separate limbs on the common core. The separate limbs may be arranged parallel to each other. Line-side windings may be located on the same limbs as the first and second windings.

The first winding and the second winding for the same electrical phase may be located in the same tank. In this case, the transformer system may comprise exactly one tank for each electrical phase. An electrical connection between the first winding and the second winding can be provided inside the tank. Accordingly, a lead-through connection is not required for forming the inter-connection between the first and second winding.

It is also possible that the first winding and the second winding for the same electrical phase are located in different tanks. In this case, the transformer system may comprise exactly two tanks for each electrical phase.

The transformer system may comprise for each electrical phase exactly three lead-through connections for one of the transformer sides, in particular for the valve-side. This may be the case when the transformer system is formed by exactly three transformer units, i.e., one unit for each phase. Further lead-through connections may be provided for the line-side.

In further embodiments, the transformer system may comprise more than three lead-through connections for the valve-side. As an example, when the first winding and the second winding of the same phase are located in different tanks, two lead-through connections may be required for the valve-side for each tank. In total, twelve lead-through connections are required for the valve-side.

According to a further aspect, a direct current converter system comprises at least one transformer system as described in the foregoing. The transformer system may comprise two of the transformer systems. A first one of the transformer systems may provide a 15° phase shift and the second one of the transformer systems may provide a −15° phase shift.

As an example, the converter system for direct current transmission comprises a first converter unit comprising at least one converter transformer comprising a first two sets of secondary windings; and a first line commutated converter (LCC) and a second LCC connected in series on a DC side, wherein the first LCC and the second LCC are coupled with respective sets of secondary windings in the first two sets of secondary windings in an extended-delta connection, respectively, to shift voltages of the first two sets of secondary windings by a phase angle of +15° and −15°, respectively. The at least one converter transformer may be formed by the transformer system as described in the foregoing.

The converter system may further comprise a second convertor unit connected in series with the first converter unit on the DC side, wherein the second converter unit comprises at least one converter transformer comprising a second two sets of secondary windings; and a third LCC and a fourth LCC connected in series on the DC side, wherein the third LCC is coupled with one of the second two sets of secondary windings in a wye connection, and the fourth LCC is coupled with another one of the second two sets of secondary windings in a delta connection.

The first converter unit may comprise two converter transformers, each converter transformer comprising a corresponding set of secondary windings in the first two sets of secondary windings, wherein the first LCC is coupled with one set of secondary windings in the first two sets of secondary windings in an extended-delta connection to shift the voltage of the set of secondary windings by a phase angle of +15°, and the second LCC is coupled with another set of secondary windings in the first two sets of secondary windings in an extended-delta connection to shift the voltage of the set of secondary windings by a phase angle of −15°. Each of or only one of the two converter transformers may be formed by a transformer system as described in the foregoing.

The present disclosure comprises several aspects and embodiments. Every feature described with respect to one of the aspects and embodiments is also disclosed herein with respect to the other aspects and embodiments, even if the respective feature is not explicitly mentioned in this context.

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

Figure 2:
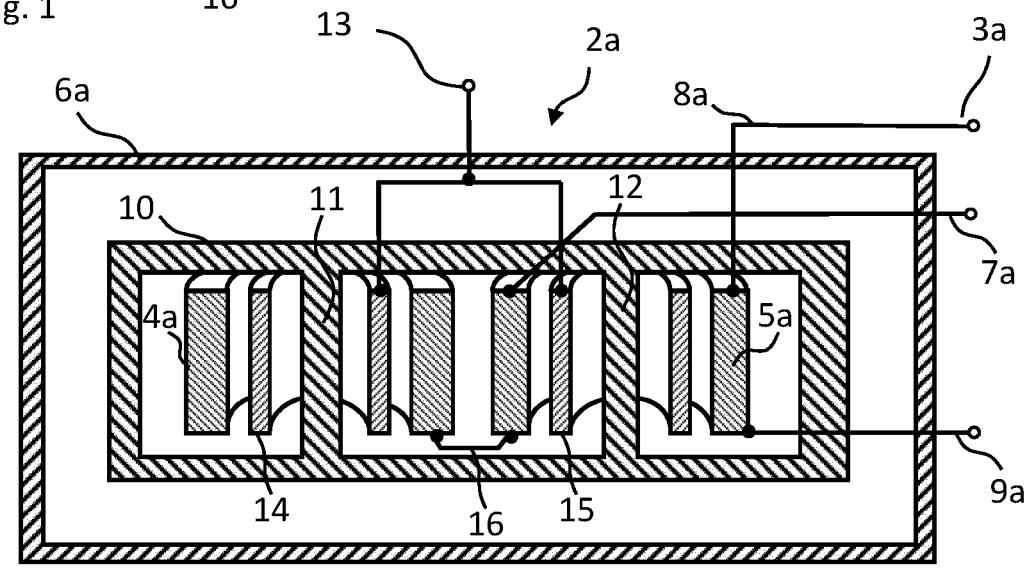
Figure 3:
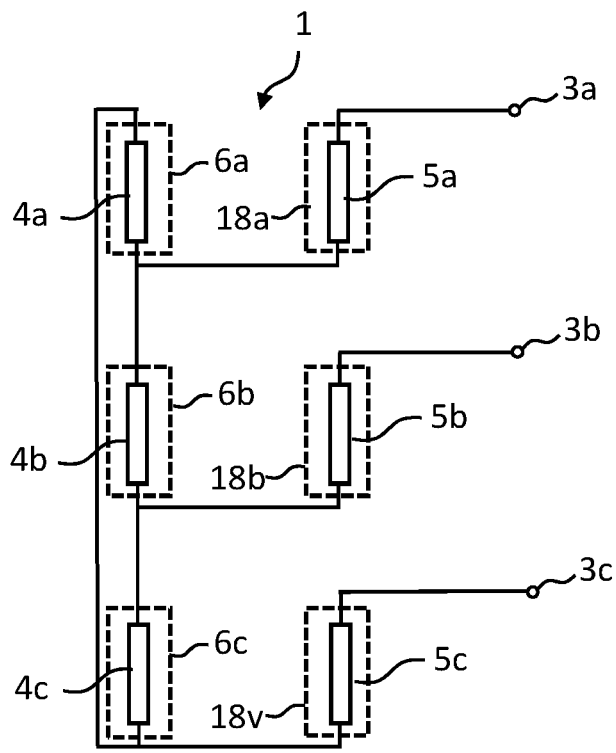
Figure 4:
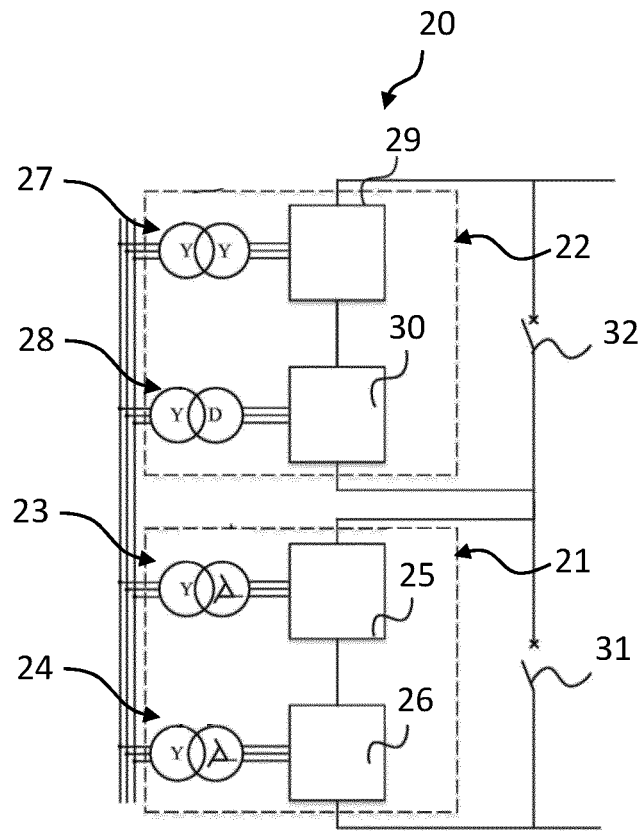

FIG. 1 shows a schematic diagram of a transformer system according to an embodiment, FIG. 2 shows a schematic cross-sectional view of a transformer unit for a transformer system according to an embodiment, FIG. 3 shows a schematic diagram of a transformer system according to a further embodiment, FIG. 4 shows a schematic diagram of a converter system according to an embodiment.

FIG. 1 shows a transformer system 1 suitable for a direct current LCC converter. The transformer system 1 provides a 15° phase shift and is, thus suitable, for 24 pulse operation, for example.

The transformer system 1 comprises three transformer units 2a, 2b, 2c being connected to different electrical phases 3a, 3b, 3c. In this figure, only a secondary side of the transformer system 1 is shown, wherein the secondary side is the valve side 4. A primary side of the transformer system 1 is a line side and may comprise windings connected in a wye or delta configuration, for example.

Each of the transformer units 2a, 2b, 2c comprises a first winding 4a, 4b, 4c and a second winding 5a, 5b, 5c. The first windings 4a, 4b, 4c are connected to each other in a delta configuration. The second windings 5a, 5b, 5c are also known as extended windings and are connected between the associated first winding 5a, 5b, 5c and the phases 3a, 3b, 3c. The connection is known as an extended-side delta connection.

The three transformer units 2a, 2b, 2c are defined by the location of the windings 4a-4c, 5a-5c in separate tanks 6a, 6b, 6c. Each of the tanks 6a, 6b, 6c may be oil-filled. Accordingly, the transformer system 1 is not a single three-phase unit, in which all transformer windings are located in a single tank but is provided as three single-phase units, where the windings for each phase are located in separate tanks 6a, 6b, 6c. In the shown case, however, each single-phase unit is a sub-part of a three-phase transformer.

The first windings 4a, 4b, 4c and second windings 5a, 5b, 5c of the same phase have a common electrical point 16a, 16b, 16c. The connection can be made inside the tank 6a, 6b, 6c in which the respective windings are located.

Due to the inter-connection of the transformer units 2a, 2b, 2c to each other and the connections to the phases 3a, 3b, 3c, each transformer unit 2a, 2b, 2c has three lead-through connections 7a-c, 8a-c, 9a-, c for the valve side 4, leading through a wall of the respective tank 6a, 6b, 6c. The first lead-through connections 7a, 7b, 7c are for connection to the first windings 4a, 4b, 4c, the second lead-through connections 8a, 8b, 8c are for connection to the second windings 5a, 5b, 5c and the third lead-through connections 9a, 9b, 9c are for connection to the common electrical points 16a, 16b, 16c. Additionally, each transformer unit 2a, 2b, 2c may have at least two lead-through connections (not depicted here) for the line side winding. In some cases, additional voltage systems and windings with its connections can be present. Accordingly, the valve side 4 of the transformer system 1 has nine lead-through connections 7a-c, 8a-c, 9a-c for the valve side 4 in total. The lead-through connections may be in the form of bushings.

The shown single-phase units reduce both the size and complexity of the transformer system 1, because fewer windings are needed in each unit. Each of the single-phase units can be separately transported to its installation site. The transformer system 1 is thus also suitable for large HVDC applications. The same transformer units 2a, 2b, 2c can be used for obtaining a phase shift of −15° by changing the external connections.

FIG. 2 shows a schematic cross-sectional view of one of the transformer units 2a, 2b, 2c. As an example, the upper-most transformer unit 2a is depicted. The other transformer units 2b, 2c can have identical designs. In this figure, also the line side is shown.

The transformer unit 2a comprises a core 10 with two wound limbs 11, 12, i.e., limbs with windings. The core 10 further comprises two side limbs, i.e., limbs without windings. It is also possible that side limbs are not provided. The first wound limb carries the first winding 4a of the valve side and the second wound limb 12 carries the second winding 5a of the valve side. The first winding 4a has a different design than the second winding 5a.

As an example, the number of turns in the first windings 4a, 5a differs by a factor of approximately a square root of three. With this ratio, the intended phase-shift of 15° degrees can be achieved for the shown design when the magnetic flux is the same for both windings. Generally, during operation, the ratio of voltages at the first windings 4a and the second windings 5a equals approximately a square root of three. This is also the case when the magnetic flux for the windings 4a, 5a is different. In other connection types other ratios might be required.

On the first wound limb 11 also a third winding 14 is located and on the second wound limb 11 also a fourth winding 15 is located. The third and fourth winding 14, 15 are windings of the line side, i.e., the primary side of the transformer 2a. A fourth lead-through connection 13 connects the windings 14, 15 to a phase of the line side. A further lead-through connection (not depicted here) will be connected to the line side windings, e.g., at the bottom of the windings. In case of a regulating winding, the further lead-through connection may be connected to the regulating winding. The position of connection to the regulating winding may be changed by a tap changer.

The third winding 14 is concentrically arranged to the first winding 4a and the fourth winding 15 is concentrically arranged to the second winding 5a. The third winding 14 and the fourth winding 15 may have the same design. The third and fourth winding 14, 15 are connected in parallel.

In general, the core may comprise an even number of wound limbs. The two windings 4a, 5a of the valve side can then be arranged around different limbs and the complexity of the wound limbs can be reduced. The even number of wound limbs may be 2, 4 or even larger than 4. As an example, the power of each winding can be split by using more wound limbs. For example, if the power at each limb is reduced by half, a transformer with four wound limbs, i.e., two first windings 4a and two second windings 5a, is provided. If the power at each limb is to be divided in three, three first windings 4a and three second windings 5a can be provided. In this case, six wound limbs may be present. The sets of first windings and second windings may be electrically connected in parallel. The number of wound limbs can be chosen in view of costs and size.

It is also possible that each of the wound limbs 11, 12 has three or more physical windings. As an example, a regulating winding, which may be connected to the line side winding, may be present in addition to one line side winding and one valve side winding.

FIG. 3 shows a transformer system 1 according to a further embodiment. The difference to the transformer system 1 of FIG. 1 is that the first windings 4*a*, 4*b*, 4*c* are also separated from the second windings 5*a*, 5*b*, 5*c* of the same phase.

The first windings 4*a*, 4*b*, 4*c* are positioned in tanks 4*a*, 4*b*, 4*c* and the second windings 5*a*, 5*b*, 5*c* are positioned in separate further tanks 18*a*, 18*b*, 18*c*. Accordingly, the transformer system 1 comprises three transformer units 2*a*, 2*b*, 2*c* and three further transformer units 18*a*, 18*b*, 18*c*. Each of the transformer units 2*a*, 2*b*, 2*c* comprises the respective delta-connected winding 4*a*, 4*b*, 4*c* and each of the further transformer units 18*a*, 18*b*, 18*c* comprises the respective extended winding 5*a*, 5*b*, 5*c*.

In this case, four lead-through connections are required per phase for the valve side, i.e., two lead-through connections per transformer unit 2*a*, 2*b*, 2*c*, 18*a*, 18*b*, 18*c*. The layout may be similar as the layout shown in FIG. 2, with a vertical separation in the center.

In the case of separate cores for the first winding 4*a* and the second winding 5*a*, the core may comprise an odd or an even number of wound limbs.

FIG. 4 shows a schematic diagram of a converter system 20 for DC power transmission according to an embodiment. The converter system 20 comprises at least one transformer system 1 as disclosed in the foregoing figures.

The converter system 20 comprise a first converter unit 21 (shown by the lower dashed box) and a second converter unit 22 (shown by the upper dashed box). The second converter unit 22 is connected in series with the first converter unit 21 on the DC side.

The first converter unit 21 comprises a first transformer system 23 and a second transformer system 24 can be the transformer system 1 as described in connection with the foregoing figures. It is also possible that one of the transformer systems 23, 24 is configured as shown in FIG. 3 and the other one is configured as shown in FIG. 1. Both transformer systems 23, 24 comprise a set of secondary windings in an extended delta connection.

The first converter unit 21 also includes a first line commutated converter (LCC) 25 and a second LCC 26 connected in series on the DC side, wherein the first LCC 25 is coupled to the set of secondary windings of the first transformer system 23 and the second LCC 26 is coupled with the set of secondary windings of the second transformer system 25 so that the voltages of the two sets of secondary windings are phase-shifted by −15° and +15° phase angle, respectively. For example, the first LCC 25 is coupled with the set of secondary windings of the transformer system 25 in an extended-side delta connection, so that the voltages of the secondary windings are phase shifted by −15° and the second LCC 26 is coupled with the set of secondary windings of the transformer system 26 in an extended delta connection such that the set of secondary windings is phases shifted by +15°.

The second converter unit 22 comprises further converter transformers 27, 28, each including two sets of secondary windings. Each set of secondary windings may be three-phase secondary windings.

The second converter unit 22 further includes a third LCC 29 and a fourth LCC 30 connected in series on the DC side. Among them, the third LCC 29 is coupled in a star connection with a set of secondary windings of the further transformer 27 and the fourth LCC 30 is coupled in a delta connection with the converter transformer 28.

As can be seen from the figure, the primary winding of each converter transformer or transformer system is coupled with the AC bus (the AC bus is shown on the left in the figure).

With the above arrangement, the voltages (e.g., line voltages) of the secondary windings of the further transformers 27, 28 and the converter transformer systems 23, 24 are phase-shifted by 0° phase angle, +30° phase angle, −15° phase angle and +15° phase angle in this sequence. The first converter unit 21 and the second converter unit 22 are both 12-pulse converter units formed by connecting two 6-pulse LCCs in series, and the first converter unit 21 and the second converter unit 22 in the series connection form a 24-pulse converter bank. This can reduce the harmonics in the circuit, especially the 12th/36th harmonics on the DC side. In one example, the 12th/36th harmonics on the DC side were reduced by more than half. As a result, the number of harmonic filters on the DC side can also be reduced, thereby reducing the footprint of the system.

In addition, since the extended-side delta connection is adopted in the first converter unit 21, the number of backup transformers in the converter system 20 can also be saved. The reason is that the same transformer can be used both as a backup transformer for a converter transformer with a phase shift of +15°, and as a backup transformer for a converter transformer with a phase shift of −15°. Therefore, in the shown example, three backup transformers can be used instead of four backup transformers, thereby saving the footprint and cost of the overall system.

In one embodiment, the second converter unit 22 may also be connected in parallel with the first converter unit 21 on the AC side, for example, as shown in FIG. 4. Thereby, the harmonics in the circuit can be further reduced, especially the 11th/13th harmonics and the 35th/37th harmonics on the AC side. In one example, the 11th/13th and 35th/37th harmonics on the AC side were both reduced by more than half. As a result, the number of harmonic filters on the AC side can also be reduced, thereby further reducing the footprint of the system.

In one embodiment, the first converter unit 21 is a low voltage converter unit and the second converter unit 22 is a high voltage converter unit. In this context, the terms "low" and "high" means that the voltages are relatively high and low when compared to the other converters and transformers in the system. However, all voltages may be high voltages in a general understanding. As an example, all voltages may be at least 100 kV. This arrangement facilitates the manufacture and installation of the system.

The converter system 20 may also include two bypass circuit breakers 31 and 32. The bypass breakers 31 is connected in parallel with the first LCC 25 and the second LCC 26 and the other bypass breaker 32 is connected in parallel with the third LCC 29 and the fourth LCC 30. Thus, by closing either of the bypass breakers 31, 32, the corresponding LCC can be bypassed, the inverter system 20 can operate at fifty percent of the full DC voltage, and the bypassed LCC can be repaired or replaced. If both bypass breakers 31 and 32 are opened, the inverter system 20 can operate at full DC voltage.

Furthermore, since the two transformers in each converter unit have a phase shift of 30° relative to each other, when one converter unit is bypassed, the other converter unit can function as a 12-pulse converter and the unit continues to work.

REFERENCE SIGNS

1 transformer system
2*a*, 2*b*, 2*c* transformers units
3*a*, 3*b*, 3*c* phases valve side
4*a*, 4*b*, 4*c* first windings 5a, 5b, 5c second windings
6a, 6b, 6c tanks
7a, 7b, 7c first lead-through connections
8a, 8b, 8c second lead-through connections
9a, 9b, 9c third lead-through connections
10 core
11, 12 wound limbs
13 phase line side
14 third winding
15 fourth winding
16a, 16b, 16c common electrical points
17 fourth lead-through connection
18a, 18b, 18c further tanks
19a, 19b, 19c further transformer unit
20 converter system
21 first converter unit
22 second converter unit
23 first transformer system
24 second transformer system
25 first line commutated converter
26 second line commutated converter
27 further converter transformer
28 further converter transformer
29 third line commutated converter
30 fourth line commutated converter
31 bypass circuit
32 bypass circuit

The invention claimed is:

1. A transformer system for a direct current converter system,
comprising a plurality of windings for three electrical phases,
the plurality of windings being electrically connected to provide a 15° phase shift,
and comprising at least three separate tanks, wherein the plurality of windings associated to different electrical phases are located in different ones of the separate tanks,
wherein for each electrical phase at least one first winding and at least one second winding electrically connected to each other,
wherein the first winding and the second winding for the same electrical phase are located in the same tank,
wherein the first winding and the second winding for the same electrical phase are located on a common core,
wherein the plurality of windings are connected in an extended-side delta connection, where the first windings in the at least three separate tanks are connected to each other in a delta configuration and the second windings in the at least three separate tanks are extended windings and are connected between the associated first windings and the electrical phases.

2. The transformer system according to claim 1, wherein the first winding and the second winding for the same electrical phase are located on separate limbs of the common core.

3. The transformer system according to claim 1, wherein the first winding and the second winding for the same electrical phase are electrically connected to each other within the same tank.

4. The transformer system according to claim 1, wherein a ratio of a number of turns in the first winding and in the second winding for the same electrical phase and/or a ratio of a voltage during operation at the first winding and at the second winding for the same electrical phase is a square root of three.

5. The transformer system according to claim 1, comprising at least three lead-through connections for one of the transformer sides for each electrical phase.

6. The transformer system according to claim 5, comprising exactly three and not more lead-through connections for one of the transformer sides for each electrical phase.

7. A direct current converter system comprising the transformer system according to claim 1 and comprising a line commutated converter connected to the plurality of windings of the transformer system.

8. The direct current converter system of claim 7, comprising two of the transformer systems and comprising two line commutated converters, each line commutated converter being connected to the plurality of windings of one of the transformer systems.

* * * * *